APPARATUS FOR DENSITY GRADIENT ELECTROPHORESIS
Original Filed May 25, 1966 4 Sheets-Sheet 1
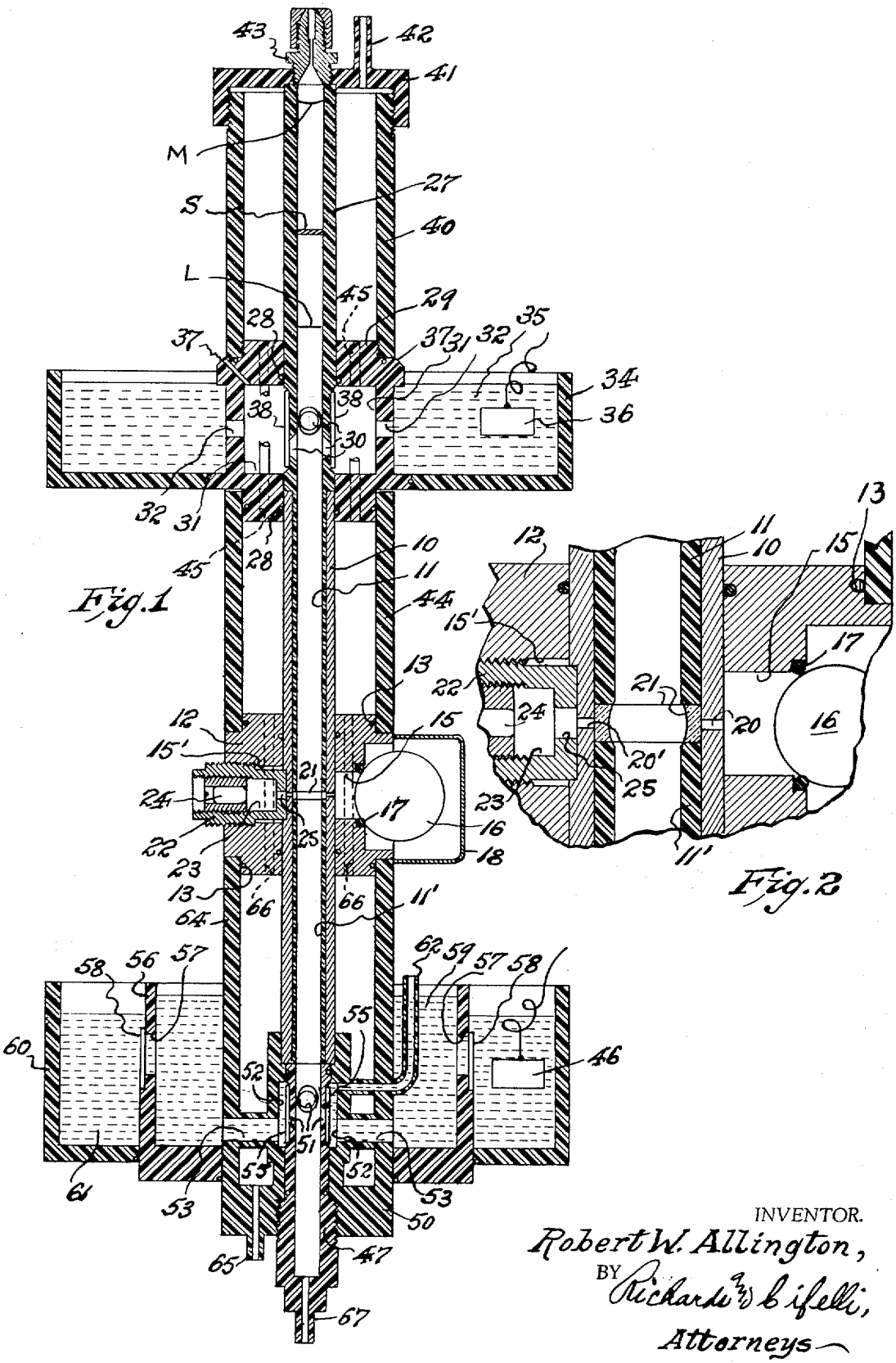
INVENTOR.
Robert W. Allington,
BY Richards & Geiger,
Attorneys

APPARATUS FOR DENSITY GRADIENT ELECTROPHORESIS

Original Filed May 25, 1966 4 Sheets-Sheet 2

INVENTOR.
Robert W. Allington,
BY Richards & Geiger,
Attorneys

APPARATUS FOR DENSITY GRADIENT ELECTROPHORESIS

Original Filed May 25, 1966 4 Sheets-Sheet 3

INVENTOR.
Robert W. Allington,
BY Richards and Geiselli,
Attorneys.

APPARATUS FOR DENSITY GRADIENT ELECTROPHORESIS

Original Filed May 25, 1966 4 Sheets-Sheet 4

INVENTOR.
Robert W. Allington,
BY Richards & Geiger,
Attorneys

United States Patent Office

Re. 27,552
Reissued Jan. 16, 1973

27,552

APPARATUS FOR DENSITY GRADIENT ELECTROPHORESIS

Robert W. Allington, 1551 Ridgeway Road, Lincoln, Nebr. 68506

Original No. 3,453,200, dated July 1, 1969, Ser. No. 552,905, May 25, 1966. Application for reissue May 10, 1971, Ser. No. 142,084
Int. Cl. B01k *5/00*
U.S. Cl. 204—301 24 Claims

Matter enclosed in heavy brackets [ ] appears in the original patent but forms no part of this reissue specification; matter printed in italics indicates the additions made by reissue.

ABSTRACT OF THE DISCLOSURE

Apparatus for separating and isolating the various solutes in complex mixtures by density gradient electrophoresis includes: a tube made of electrical insulating material for receiving a density gradient liquid, means including a reversible pump for pumping a displacing liquid into and out of the tube to position the density gradient liquid within a predetermined portion of the tube, a light passageway through the tube, a light source positioned to transmit light rays through the light passageway, means including a light transducer responsive to the concentration of liquid in the tube and positioned to receive the light rays transmitted through the light passageway, a light filter interposed between the light passageway and light transducer, and means establishing an electric field across axially spaced points within the tube. The means for establishing the electric field consist of electrodes connected to a source of D.C. current and immersed in buffer solutions in communication with the liquid in the tube; semi-permeable membranes being used in association with one or both electrodes to prevent mixing of the buffer solutions with the liquid in the tube.

This invention relates to apparatus for separating and isolating the various solutes in complex mixtures and more particularly to improved apparatus for density gradient electrophoresis.

Electrophoresis refers to a process for the separation of mixtures of chemicals on the basis of their mobility in electric fields. Generally, the separation takes place with the sample liquid suspended in a conductive medium. When an electric field is applied to the supporting medium the particles of the material to be separated migrate in a direction dependent upon the sign of their net electrical charge, the migration rate being directly proportional to the net charge and inversely proportional to friction forces. The friction forces, tending to hold the particles stationary in the medium, depend upon the size and shape of the particular particles.

Various techniques have been proposed for making electrophoretic separations. The classical, moving boundary method involves starting with a uniform mixture of the material to be separated and a supporting medium, usually water with a salt buffer added. The medium is placed in a vertical tube and an electric field is applied by means of electrodes affixed to the tube. The bottom of the tube is bent upwardly to form a U in order to maintain hydrostatic equilibrium and to eliminate the possibility of bubbles from the electrodes passing through the area of interest. As the process progresses, the different components of the sample migrate downwardly through the supporting medium at various, different rates depending upon their electrophoretic mobility. A boundary forms at the top of each downwardly-moving column made up of individual particles of given species. If the tube, containing the supporting medium, is made of transparent material, the tops of the various downwardly-migrating columns can be determined by the refractive index gradient method. This technique, however, suffers from at least two disadvantages. The range of concentrations of the individual species of particles is limited because, in order for the boundary to be stable, the density of the liquid below the boundary must be greater than that of the liquid above the boundary. Consequently, the concentration must be great enough so that the overall density of the liquid below the boundary is significantly greater than that of the supporting liquid above the boundary. This often presents a problem because of agglomeration of the sample particles at high concentrations. In addition, the boundaries tend to become diffuse because of diffusion of the particles. Furthermore, it is difficult to arrange the apparatus so that the migration of both upward and downward moving boundaries can be studied.

Another prior arrangement generally is referred to as gel column electrophoresis. The sample is placed at the top, bottom or middle of a conducting column formed of a semi-solid gel. An electric field is applied to the top and bottom of the gel and the particles migrate in a direction, and at a velocity, depending upon their electrophoretic mobilities. In this method, the material to be separated is placed in a narrow band in the gel and is not uniformly distributed throughout the gel. This results in bands, or zones, of the material migrating either upwardly or downwardly, depending upon the sign of their electrophoretic mobility. The method has the advantage of eliminating, substantially, degradation of resolution due to the effects of diffusion and is adapted for a simultaneous separation of materials of both positive and negative mobilities, provided the sample is placed in the middle of the gel column. However, this method does not lead itself to monitoring of the separation process as it is taking place. The location of the various zones of the particles, after separation, can be measured by a suitable technique, such as light absorbance, but it is not readily possible to make such measurements while the electrophoretic process is in operation. Furthermore, the rate of migration is dependent upon absorption and disorption effects between the particles being separated and the supporting gel. In consequence, the particle migration rates are not necessarily dependent solely upon their electrophoretic mobilities. This is a significant disadvantage when it is desired to measure electrophoretic mobilities.

A third method is density gradient electrophoresis. The method is somewhat similar to the gel column method but the supporting medium is a density gradient column instead of a gel column. The advantage of this method lies in the fact that the rate of migration of the bands, or zones, or the particles can be calculated from their electrophoretic mobilities. However, conventional apparatus for density gradient electrophoresis does not provide a means for monitoring the position of the zones at various times throughout the process, only the final positions of the zones can be measured when the density gradient column is removed from the apparatus.

Apparatus made in accordance with this invention comprises a vertical tube having a dense supporting fluid in the bottom portion, a density gradient column which includes the chemical sample disposed over the dense fluid, and a low density fluid at the top. Electrodes are immersed in electrolyte solutions disposed near the top and the bottom of the tube. Semi-permeable membranes are utilized to permit ionic current flow from the electrolyte solutions to the fluid columns contained within the vertical tube while isolating such solutions from the colunms. Additionally, the lower electrode is isolated from the columns of fluids by two stages of successively less dense electrolyte solutions, thereby to prevent entry of the electrolyte into fluid column by osmosis, the concentration of the first stage being adjusted with respect to the concentration of the column so as to equalize the osmotic pressures. At an intermediate position of the tube, monitoring windows are provided to permit the passage of light rays from a suitable source, through the fluid column and to a light transducer. To fractionate a sample into its constituents, the electrodes are connected to a D.C. voltage source, thereby causing a current to flow through the fluid column. This causes the particles of the sample to migrate at a rate depending upon their electrophoretic mobility. During migration, particles of similar electrophoretic mobility tend to collect in zones. Means are provided for monitoring the extent to which the sample has been fractionated into zones. Such means include a pump for adding or withdrawing the dense supporting fluid from the tube, thereby to move the sample through the light beam at any desired stage of the electrophoretic process. When the monitoring device reveals that the desired fractions have been obtained, additional support fluid is forced into the bottom of the tube to force the density gradient column out at the top for collection by a conventional fraction collector.

An object of this invention is the provision of improved apparatus for density gradient electrophoresis which apparatus includes means for monitoring the extent to which a chemical sample has been fractionated as the fractionating process progresses.

An object of this invention is the provision of fractionating apparatus of the density gradient electrophoresis class, which apparatus includes means for the convenient introduction of a density gradient column and a sample to be fractionated as well as the physical removal of the fractions from the apparatus after the electrophoretic process has been completed.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a vertical, central, cross-sectional view of a portion of the apparatus made in accordance with this invention;

FIGURE 2 is a similar, fragmentary view showing the central portion of the apparatus and drawn to an enlarged scale;

Figure 3:
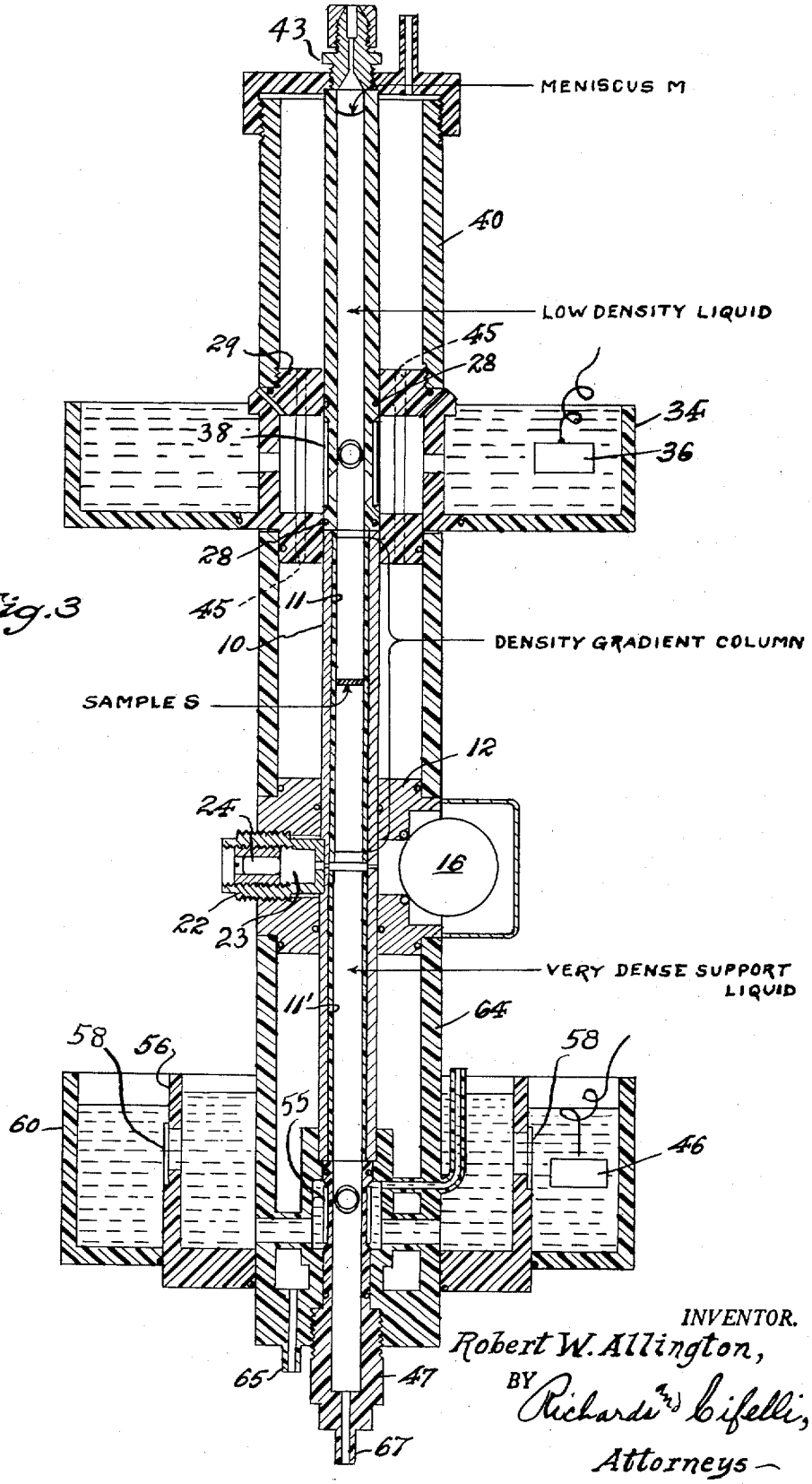
FIGURES 3 and 4 are simplified representations corresponding to FIGURE 1 to show the positions of the liquids contained in the central tubes at various stages in the operating cycle of the apparatus.

Reference now is made to FIGURE 1. The apparatus comprises a vertically-disposed tube 10 made of a material having good thermal conductance such as, for example, aluminum. Disposed within this tube are a pair of axially-aligned tubes 11 and 11', the latter constituting an inner liner for the tube 10 and being made of a suitable plastic, such as polypropylene, which is substantially non-wetting, does not absorb a surface film of water, and is non-conducting to prevent short circuiting of an electric field within it. As will be described hereinbelow, the electrophoretic separation of a fluid mixture takes place within the tubes 11 and 11'. The metal, outer tube 10 passes through a central hole formed in the metal support block 12 and carries a pair of sealing rings 13. This block, also made of a material having a good thermal conductance, such as aluminum, has diametrically-aligned holes 15, 15' formed through the walls thereof, the hole 15 terminating in an enlarged-diameter bore for accommodating a portion of a lamp 16, said lamp being mounted to abut a resilient washer 17, thereby to maintain a fixed lamp orientation in the optical system of the apparatus. The lamp is enclosed within a housing 18 which is secured to the block 12, by suitable means, and provided with perforations for heat dissipation.

As best shown in the enlarged view of FIGURE 2, diametrically-opposed holes 20, 20' are formed through the wall of the metal tube 10, which holes communicate with the respective holes 15, 15' formed in the support block 12. Clampingly secured between adjacent ends of the tubes 11, 11' is a window in the form of a quartz ring 21. The hole 15', formed in the block 12, is provided with an internal thread receiving the threaded metal plug 22 carrying a light filter 23 and a photocell 24. It will be noted the end of the plug has formed therein a hole 25 aligned with the hole 20'. It will be apparent that the aligned holes 25, 20' and 20 and the quartz ring 21 form a passageway for light rays from the lamp to the photocell.

Referring now to the upper portion of FIGURE 1, a tube 27, carrying sealing rings 28, has its lower portion extending into a central hole formed in an upper fitting 29 preferably made of a transparent, non-conducting plastic such as polymethyl methacrylate. The tube 27, made of a transparent, non-wetting plastic, such as polycarbonate, has an inside diameter corresponding to that of the tube 11 and the ends of these tubes are in abutting engagement. The lower portion of the tube 27 is provided with four ports 30 oriented at an angular spacing of 90°. Each port communicates with radially-extending openings 31 formed in the fitting 29, and each of such openings communicating with radial holes 32 formed in the fitting wall. A cylindrical chamber or trough 34, preferably made of a transparent, non-conducting plastic, is 35 in which is immersed an upper electrode 36. This solution fills the openings 31, vents 37 being provided in the fitting to allow air to escape, thereby to insure the complete filling of such openings by the buffer solution. The ports 30, in tube 27, are covered by a tubular, semi-permeable membrane 38, such as cellophane. Ionic current flow from the electrode is conducted by the buffer solution and passes through the membrane into a liquid contained within the tube 27. The purposes of the membrane is to prevent liquid flow between the tube and the buffer solution. The tube 27 serves as a container for the density gradient column and also provides a necessary clearance space for a conducting covering liquid over the density gradient column.

The upper end of the fitting 29 is of a reduced diameter and threaded to receive the threaded end of a transparent plastic tube 40 forming a water jacket. A cap 41 is threaded onto the upper end of the tube, and said cap being provided with a hose nipple 42 and having a central bore for receiving the upper end of the tube 27. Threaded into the central hole of the cap is a pipe coupling 43. A similar, transparent water jacket tube 44 has ends force-fitted over the reduced-diameter ends of the fitting 29 and the support block 12. A plurality of longitudinally-extending tubes 45 extend through the fitting 29, which tubes serve as passageways for the flow of a liquid coolant through the fitting 29.

The lower part of the apparatus includes a similar arrangement for providing an electrical path from the lower electrodes 46 to a column of liquid within the plastic lower tube 47, said tube corresponding to the upper tube 27. The tube 47 has an externally-threaded lower portion received in a central threaded hole formed in the lower fitting 50 made of the same material as the upper fitting 29. Four ports 51 are formed in the wall of the tube 47, each port normally communicating with an associated one of the central openings 52 formed in the fitting. These openings communicate with associated, radial holes 53. The ports 51 are covered by a tubular, semi-permeable membrane 55. An inner, cylindrical chamber, or trough 56, is carried by the fitting and is provided with a plurality of holes 57 extending through the side wall, each such hole being covered by a semi-permeable membrane 58. This trough contains a buffer salt solution 59. An outer, cylindrical chamber, or trough 60, surrounding and secured to the inner trough 56, contains a buffer salt solution 61 in which the electrode 46 is immersed. The central openings 52, in the fitting, communicate with each other and a vent 62 to insure complete filling of the openings by the buffer solution 59.

The inner trough 15 is required because a high concentration of dense solute in the tube 47, at the level of the ports 51, would cause osmotic flow from the trough 56 into the tube, unless the concentration of such solute also is high in the surrounding buffer chamber. This high concentration of dense solute may have a tendency to foul the electrode and, therefore, the dense solution in the inner trough is separated from a less dense solution 61 by the membrane 58. Osmotic flow across the membrane 38, carried by the upper tube 27, is not as detrimental to operation as osmotic flow through the membrane 55 carried by the lower tube 47, because osmotic flow through the membrane 55 will vary the position of the density gradient column within the tubes 11 and 11'. Osmotic flow through the upper membrane 38 will not vary the position of the density gradient column, but will only vary the level of the lower-density liquid riding on top of the density gradient column. The position of the density gradient column must be undisturbed in order that photometric measurements of the positions of the separated bands can be made accurately by means of light passing from the lamp, through the quartz window and to the photocell-filter assembly. In order to prevent reverse osmosis through the lower membrane 55, because of the pressure of the liquid column, the concentration of the solute in the inner trough 56 can be made less than that of the liquid in the tube 47. This will cause an osmotic pressure difference across the membrane 55 which will equalize the pressure of the liquid column in the tube.

With continued reference to the lower portion of FIGURE 1, the fitting 50 includes a cylindrical portion 64 connected to the metal block 12 and forming a water jacket. This fitting also includes a hose nipple 65 which communicates with internal passageways formed in the fitting, which passageways communicate with the space between the tube 10 and the surrounding jacket 64, the latter being made of the same material as the other jackets 44 and 40. During operation of the apparatus, ice water is circulated through the jackets, the central support block 12 being provided with longitudinally-extending holes 66 for this purpose. The exposed end of the lower tube 47 terminates in a hose fitting 67 for purposes which will now be described.

To load the apparatus, a very dense liquid is injected into the center tubes, through the fitting 67, until the surface of the liquid reaches the level L, indicated in FIGURE 1. The top pipe fitting 43 is removed and a density gradient liquid is pipetted on top of the dense support liquid. When the level of the density gradient liquid reaches substantially the mid-point of the tube 27, the pipette is removed and a sample solution, or suspension S is introduced, such sample solution being mixed with enough solute so that it has a slightly lower density than the density gradient column immediately underneatth it. The pipette for introducing the sample now is removed and an additional density gradient column is pipetted above the sample. The bottom of this density gradient column has a density slightly lighter than that of the sample solution and the upper surface thereof is represented by meniscus M.

Next, enough of the dense support liquid is withdrawn through the lower fitting 67 so that the density gradient column and the sample solution occupy the positions shown in FIGURE 3, which figure corresponds to FIGURE 1 but with the cross-hatching and other matter omitted as these are not essentiail to a proper understanding of this portion of the description. Additional low density buffer solution is pipetted on top of the density gradient column so that the meniscus is approximately as shown. It is assumed that the chambers 34, 56 and 60 have been filled with electrically conducting buffer solutions. An electric field is impressed on the density gradient column by applying a potential across the electrodes 36 and 46. Bubble formation may take place around the electrodes but the semi-permeable membranes 38, 55 and 58 serve as barriers to prevent these bubbles from disturbing the density gradient column in the central tubes.

After a suitable time interval has passed to allow partial separation of the sample solution by electrophoretic migration, the power supply to the electrodes is turned off and the dense supporting liquid is slowly withdrawn from the bottom of the columns through the fitting 67. The density gradient column and the partially resolved fractionated zones of the sample will pass downwardly through the light beam of the light absorbance measuring system consisting of the lamp 16, filter 23 and photocell 24 and a suitable read-out device such as a recorder. The recorder can be used to provide a chart record of light absorbance and, therefore, concentration, of the fractionated zones, plotted against the position of the zones in the density gradient column.

Figure 4:
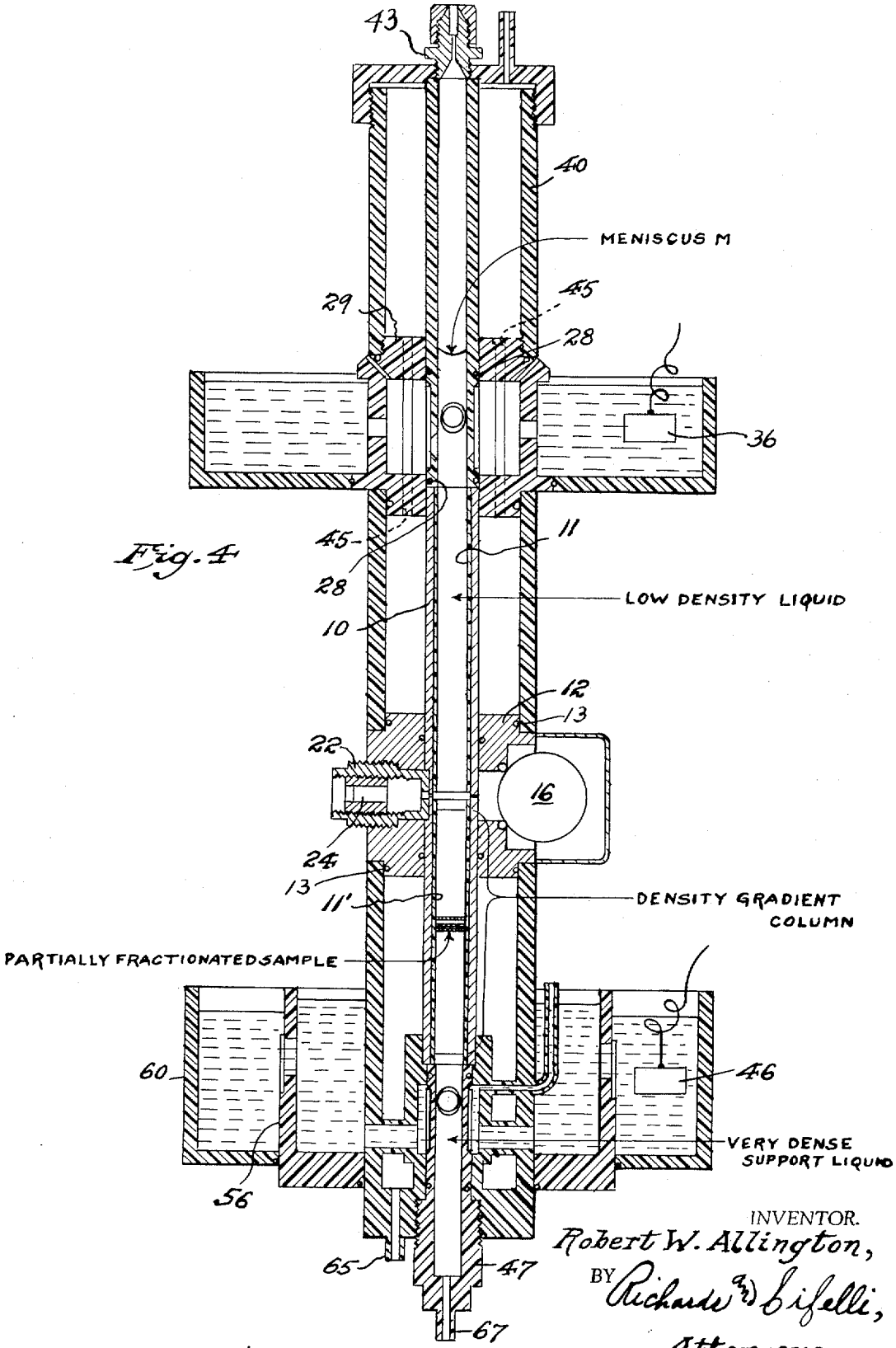

The position of the density gradient column, after the first pass through the optical system, is shown in FIGURE 4. At this time, the pump for withdrawal of the dense support liquid is stopped and the electric field again is applied to the density gradient column. Further migration and separation takes place and after a suitable time interval the electric field is turned off. Now, the pump is started and dense support liquid is forced into the bottom of the central tubes, through the fitting 67, thereby raising the further fractionated density gradient column past the photometric scanning system and back to the position shown in FIGURE 3. During this scanning cycle, the recorder again records the position of the zones in the density gradient column. This process of scanning the density gradient column, as the dense support liquid is withdrawn from and injected back into the central tubes, can be repeated as often as desired. After it is seen, from the recorder chart, that a suitable separation has taken place, the pump for injecting the dense liquid into the bottom of the column can be used to inject enough of such liquid into the central tubes to force the density gradient column out through the top fitting 43. A delivery tube can be connected to this fitting to direct the fractionated sample into various collecting tubes of a conventional fraction collector, as will be described below.

As stated hereinabove, ice water may be circulated through the apparatus to cool the liquid in the central tubes. The electric current passing through the liquid column tends to heat it and, unless cooled, a hot area could develop which would encourage convection flow within the tubes, thereby destroying the integrity of the separating zones. The cooling fluid, forced into the nipple 65, see FIGURE 1, circulates through the lower fitting 50 which surrounds the membrane 55, through the vertical holes 66 formed in the metal support block 12 which supports the photocell and light source, through the vertical tubes 45 in the fitting 29 which surrounds the membrane 38, and eventually out through the discharge nipple 42. The outer casing, comprising the water jacket, preferably is made of a transparent plastic.

Figure 5:
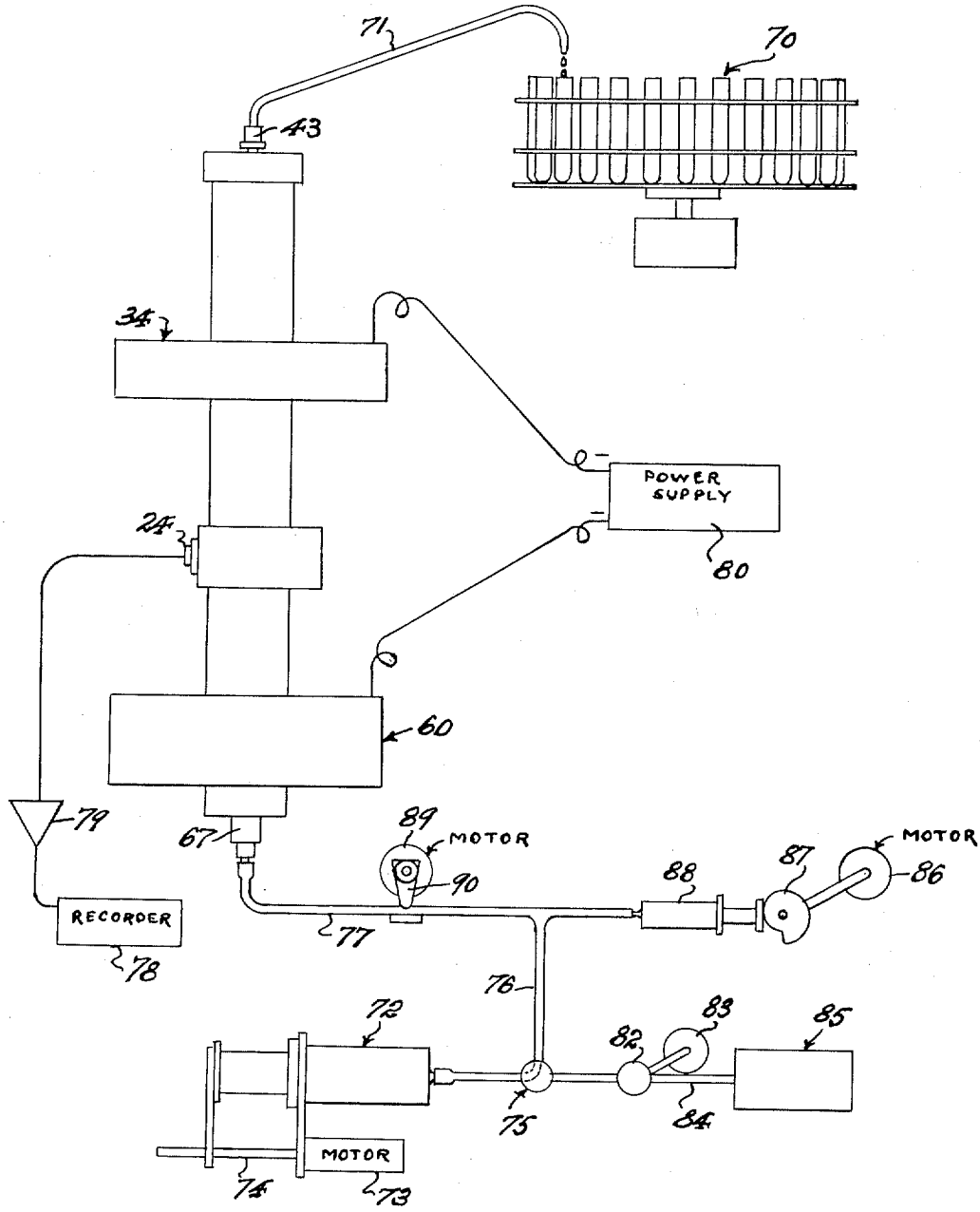
FIGURE 5 is a diagrammatic representation of the complete apparatus.

Reference now is made to FIGURE 5, which is a diagrammatic representation of the apparatus described above, along with other refinements. A conventional fraction collector 70 is arranged to receive liquid from the delivery tube 71 connected to the upper hose fitting 43. A syringe 72, controlled by a reversible motor 73 and an associated lead screw 74 supplies dense support liquid to the bottom of the apparatus through the 3-way stopcock 75, tubing 76 and 77, the latter being connected to the lower hose fitting 67 of the apparatus. A recorder 78 is connected to the photocell 24 through a suitable amplifier 79. The D.C. power supply 80 provides the necessary voltage and current to set up the electric field in the density gradient column through the two electrodes immersed in the conducting solutions contained in the cylindrical troughs 34 and 60. The pump 82, driven by a motor 83, is connected in the line 84 interposed between a conventional gradient forming apparatus 85 and the stopcock 75. This system constitutes a means for introducing the density gradient liquid into the central tubes of the main part of the apparatus instead of pipetting it in through the top of the apparatus as has been described above. With the stopcock 75 set to permit flow between the lines 84 and 76, the motor 83 is energized. When one-half of the desired volume of the density gradient liquid has been introduced into the line 76, the motor 86 is energized. This motor rotates a cam 87 which forces the sample solution, contained in the syringe 88, into the line 76. The cam preferably is shaped so that the initial travel velocity of syringe 88 is greater than the final velocity. This will tend to prevent an inverse density gradient from forming at the interface below the sample band. Alternatively, the formation of an unstable, inverse density gradient at the location of the sample band can be minimized by increasing the gradient provided by the gradient forming apparatus 85 at the time the sample is injected into the line 76. A motor 89, provided with an eccentrically-operated push arm 90, vibrates and squeezes the tubing 77 in such a way as to uniformly mix the sample liquid and the density gradient liquid as they flow past it and into the central tubes of the apparatus.

When a sufficient amount of the sample has been forced into the line 76, the motor 86 is deenergized. The density gradient producing apparatus 85 continues to function until the density gradient column is complete. The stopcock 75 then is rotated back to the illustrated position and the motor-operated syrine 72 is used to force a very dense liquid under the density gradient column until the level of such column is as shown in FIGURE 3. The low density liquid which must be placed on top of the density gradient column, for providing electrical contact with the buffer solution contained in the upper trough 34, may be inserted by means of pipetting it in manually through the top of the apparatus, as described above. Alternatively, the low density liquid may be introduced by means of suitable programming of the density gradient forming apparatus, or by means of an additional motor-operated syringe connected into the line 76.

Having now described the construction and operation of the apparatus, those skilled in this art will be able to make various changes and modifications without thereby departing from the spirit and scope of the invention as recited in the following claims.

I claim:

1. Apparatus for density gradient electrophoresis comprising:

(a) a tube made of electrical insulating material for receiving a density gradient liquid, (b) means including a reversible pump for pumping a displacing liquid into and out of the said tube thereby to position the density gradient liquid within a predetermined portion of the tube, (c) means carried by the tube at a point intermediate the ends thereof and responsive to the concentration of liquid contained within the tube, and (d) means establishing an electric field across axially-spaced points within the tube.

2. The invention as recited in claim 1, including means forming a light passageway through the tube and a light source positioned to transmit light rays through said light passageway, and wherein the said means responsive to the concentration of the liquid comprises a light transducer positioned to receive light rays transmitted through the said light passageway, and a light filter interposed between the light transducer and the light passageway.

3. Apparatus for density gradient electrophoresis comprising:

(a) a vertical positioned tube of electrical insulating material for receiving a density gradient liquid, (b) means forming a transverse light passageway through the tube at a point intermediate the ends thereof, (c) a light source positioned to transmit light rays through said light passageway, (d) a light transducer positioned to receive light rays transmitted through said light passageway, (e) means including a reversible pump for pumping a displacing liquid into and out of the tube through the lower end thereof thereby to maintain a density gradient liquid at a predetermined level within the tube, and (f) means establishing an electric field across axially-spaced points within the said tube,

4. The invention as recited in claim 3, wherein the said means establishing an electrical field comprises a first chamber containing a buffer solution; a first opening formed in the wall of said tube and normally communicating with said first chamber; a semi-permeable membrane covering the said first opening; a second chamber containing a buffer solution; a second opening formed in the wall of said tube and normally communicating with the said second chamber; a semi-permeable membrane covering the said second opening; electrodes immersed in the solutions contained in the two chambers; and a source of D.C. voltage connected to the electrodes.

5. The invention as recited in claim 3, wherein the said means establishing an electrical field comprises a first chamber containing a buffer solution; a first opening formed in the wall of said tube and normally communicating with said first chamber; a semi-permeable membrane covering the said first opening; a second chamber containing a buffer solution; a second opening formed in the wall of said tube and normally communicating with the second chamber; a semi-permeable membrane covering the said second opening; a third chamber containing a buffer solution; means forming a liquid-transfer passageway between the second and third chambers; a semi-permeable membrane covering the said liquid-transfer passageway; electrodes immersed in the solutions contained within the said first and third chambers; and a source of D.C. voltage connected to the electrodes.

6. The invention as recited in claim 5, wherein the displacing liquid has a concentration so as to equalize the osmotic pressures across the said second membrane.

7. The invention as recited in claim 3 wherein the said means forming a transverse light passageway through the tube comprises a quartz ring, and wherein the said axially-spaced points across which the electrical field is established lie on opposite sides of said quartz ring.

8. The invention as recited in claim 3, including a fraction collector and a delivery tube connected to the upper end of said vertically-positoned tube for discharging the fractionated density gradient column into the fraction collector as additional displacing liquid is pumped into the bottom of the vertically-disposed tube.

9. The invention as recited in claim 3, including a device forming a density gradient liquid; a container containing a sample liquid to be fractionated; means for injecting predetermined quantities of the samples and density gradient liquids into the said vertically-disposed tube through the bottom end thereof; and means for mixing the sample and density gradient liquids prior to injection thereof in the said tube.

10. The invention as recited in claim 9, including means injecting the sample liquid in a controlled rate such that a maximum quantity of the sample liquid is injected without inversion of the density gradient.

11. The invention as recited in claim 10, including means increasing the gradient of the density gradient liquid as the sample liquid is injected into the said tube.

12. Apparatus for density-gradient electrophoresis comprising:

(a) a central support block,
(b) a vertically positioned central tube of electrical insulating material passing through a hole formed in the support block,
(c) a light source carried by the support block,
(d) a light transducer carried by the support block,
(e) means forming transverse, aligned light passageways in the support block and wall of said central tube for transmission of light rays from the source to the light transducer.
(f) a light filter positioned between the light transducer and the said central tube,
(g) an upper fitting made of electrical insulating material and having an axial hole receiving the upper portion of the central tube,
(h) an upper tube of electrical insulating material, said tube having an end disposed in the axial hole of the upper fitting and in engagement with the upper end of the central tube,
(i) an opening formed in the wall of said upper tube,
(j) a first chamber carried by said upper fitting and containing a buffer solution, said chamber normally communicating with the opening formed in the wall of the upper tube,
(k) a semi-permeable membrane covering the opening formed in the upper tube,
(l) an electrode immersed in the solution contained in the said first chamber,
(m) a lower fitting made of electrical insulating material and having an axial hole receiving the lower portion of the central tube,
(n) a lower tube of electrical insulating material, said tube having an end disposed in the axial hole of said lower fitting and in engagement with the lower end of the central tube,
(o) an opening formed in the wall of the said lower tube,
(p) a second chamber carried by the lower fiting and containing a buffer solution, said chamber normally communicating with the opening formed in the wall of the lower tube,
(q) a semi-permeable membrane covering the opening formed in the lower tube,
(r) a third chamber carried by said lower fitting and surrounding the second chamber and containing a buffer solution,
(s) a plurality of openings formed in the side wall of the second chamber and lying below the level of the solutions contained in the second and third chambers,
(t) semi-permeable membranes covering the openings formed in the side wall of the second chamber,
(u) an electrode immersed in the solution contained in the third chamber,
(v) a source of D.C. voltage connected to the electrodes; and
(w) means for injecting a predetermined quantity of dense solute into the said central tube.

13. The invention as cited in claim 12, wherein the concentration of the dense solute is such as to equalize the osmotic pressures across the membrane covering the opening formed in the said lower tube.

14. The invention as recited in claim 12, including means forming a tubular water jacket radially spaced from the said central, upper and lower tubes and extending substantially the combined length thereof.

15. Apparatus for density gradient electrophoresis comprising:

(a) a vertically positioned tube of electrical insulating material for receiving a density gradient liquid,
(b) means including a reversible pump for pumping a displacing liquid into and out of the tube through the lower end thereof thereby to maintain a density gradient liquid at a predetermined level within the tube,
(c) means forming a transverse light passageway through the tube at a point intermediate the ends thereof,
(d) a light source positioned to transmit light rays through said light passageway, and
(e) means establishing an electric field across axially-spaced points within said tube and comprising a first chamber containing a buffer solution, a first opening formed in the wall of said tube and normally communicating with said first chamber, a semi-permeable membrane covering the said first opening, a second chamber containing a buffer solution, a second opening formed in the wall of said tube and normally communicating with the said second chamber, a semi-permeable membrane covering the said second opening, electrodes immersed in the solutions contained in the two chambers, and a source of D.C. voltage connected to the electrodes.

16. Apparatus for density gradient electrophoresis comprising:

(a) a vertically positioned tube of electrical insulating material for receiving a density gradient liquid,
(b) means including a reversible pump for pumping a displacing liquid into and out of the tube through the lower end thereof thereby to maintain a density gradient liquid at a predetermined level within the tube,
(c) means carried by the tube at a point intermediate the ends thereof and responsive to the concentration of liquid contained within the tube, and
(d) means establishing an electric field across axially-spaced points within said tube and comprising a first chamber containing a buffer solution, a first opening formed in the wall of said tube and normally communicating with said first chamber, a semi-permeable membrane covering the said first opening, a second chamber containing a buffer solution, a second opening formed in the wall of said tube and normally communicating with the said second chamber, a semi-permeable membrane covering the said second opening, electrodes immersed in the solutions contained in the two chambers, and a source of D.C. voltage connected to the electrodes.

17. The invention as recited in claim 3, wherein the said means establishing an electric field comprises a first chamber containing a buffer solution; a first opening formed in the wall of said tube and normally communicating with said first chamber; a semi-permeable membrane covering the said first opening; a second chamber containing a buffer solution; a second opening formed in the wall of said tube and normally communicating with the second chamber; a semi-permeable membrane covering the said second opening; third and fourth chambers each containing a buffer solution; means forming liquid transfer passageways between the first and fourth chambers and second and third chambers; semi-permeable membranes covering said liquid transfer passageways between said first and fourth chambers and said second and third chambers; electrodes immersed in the solutions contained within said third and fourth chambers; and a source of D.C. voltage connected to the electrodes.

18. Apparatus for density gradient electrophoresis comprising:

(a) a vertically positioned tube of electrical insulating material for receiving a density gradient liquid;
(b) means for connecting a pump to said apparatus for controlling the volume of a displacing liquid in the tube to maintain a density gradient liquid at a predetermined level within said tube; and (c) means establishing an electric field across axially-spaced points within said tube and comprising a first chamber containing a buffer solution; a first opening formed in the wall of said tube and normally communicating with said first chamber; a semi-permeable membrane covering the said first opening; a second chamber containing a buffer solution; a second opening formed in the wall of said tube and normally communicating with the second chamber; a semi-permeable membrane covering the said second opening; third and fourth chambers each containing a buffer solution; means forming liquid transfer passageways between the first and fourth chambers and second and third chambers; semi-permeable membranes covering said liquid transfer passageways between said first and fourth chambers and said second and third chambers; electrodes immersed in the solutions contained within said third and fourth chambers; and a source of D.C. voltage connected to the electrodes.

*19. The invention as recited in claim 1 wherein a certain portion of the said tube extends beyond the region of the said electric field, the said certain portion of tube being adapted to intermittently receive the liquid in the tube when the said reversible pump is operated.*

*20. The invenion as recited in claim 19 wherein the said certain portion of the tube is located above the said region of the electric field.*

*21. The invention as recited in claim 3, wherein a certain portion of the said tube extends beyond the region of the said electric field, the said certain portion of tube being adapted to intermittently receive the liquid in the tube when the said reversible pump is operated.*

*22. The invention as recited in claim 21, wherein the said certain portion of the tube is located above the said region of the electric field.*

*23. The invention as recited in claim 19 wherein the said certain portion of the tube is also located beyond the point where the said means responsive to concentration is situated.*

*24. The invention as recited in claim 21, wherein the said certain portion of the tube is also located beyond the point where the said means responsive to concentration is situated.*

References Cited

The following references, cited by the Examiner, are of record in the patented file of this patent or the original patent.

UNITED STATES PATENTS

| | | | |
|---|---|---|---|
| 3,326,790 | 6/1967 | Bergrahm | 204—180 |
| 3,346,479 | 10/1967 | Natelson | 204—301 |

HOWARD S. WILLIAMS, Primary Examiner

A. C. PRESCOTT, Assistant Examiner

U.S. Cl. X.R.

204—180 R, 180 G, 180 P